Dec. 5, 1961 R. A. MATTHIESSEN 3,011,818
AUTOMOBILE TRUNK LID HOLDER
Filed April 24, 1959 2 Sheets-Sheet 1

Inventor:
Roy A. Matthiessen,
By
Attorney.

Dec. 5, 1961  R. A. MATTHIESSEN  3,011,818
AUTOMOBILE TRUNK LID HOLDER
Filed April 24, 1959  2 Sheets-Sheet 2
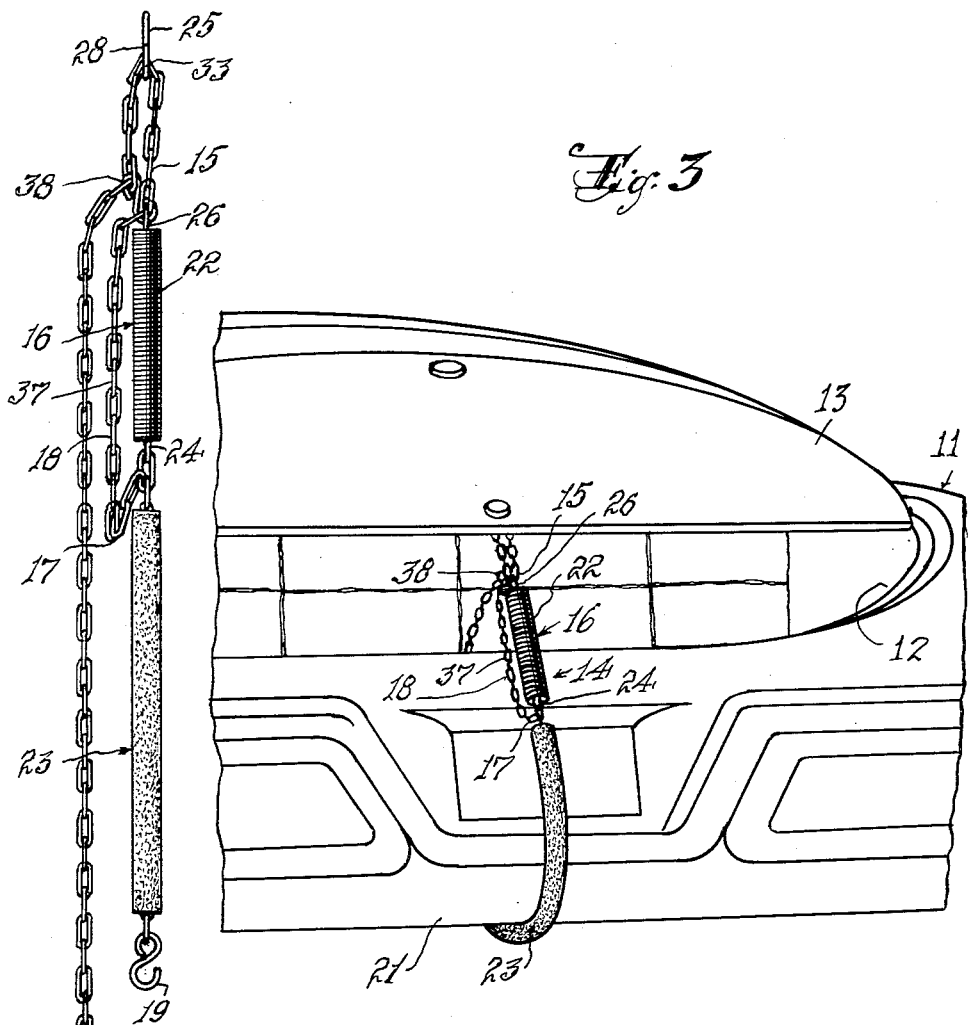
Inventor:
Roy A. Matthiessen
By Harry B. Keck,
Attorney United States Patent Office 3,011,818
Patented Dec. 5, 1961

3,011,818
AUTOMOBILE TRUNK LID HOLDER
Roy A. Matthiessen, 30 Sandy Hill Road, Westfield, N.J.
Filed Apr. 24, 1959, Ser. No. 808,642
2 Claims. (Cl. 292—288)

This invention relates to means for resiliently holding closures in engagement with objects or goods in containers and is particularly designed for use with trunks of automobiles and lids therefor.

Owners and users of automobiles find that it is often desirable to utilize the trunks thereof while maintaining their lids only partly shut. Examples of this are in transporting small animals, packages and other objects, where it is either necessary to vent the trunk to provide air for the animals or where it is impossible to close the trunk because of the size or number of the objects contained therein. Improvised means, such as inserting a chock between the trunk lid and automobile body, together with ropes for holding the lid down against opening during transport, may be used but leave much to be desired.

It is, accordingly, an object of my invention to provide a flexible connector to be disposed between the trunk lid of an automobile, or other closure member, and the body portion forming the trunk or other associated container, and having means at the ends thereof for interengagement with parts of the container and parts of the closure member, and spring means having its ends connected to said connector at points intermediate the length of said connector spaced apart a distance greater than the length of said spring whereby the closure or trunk lid is resiliently held in a partially open position, engaging a package, other material in the trunk, or a chock for preventing complete closure of said lid.

Another object of my invention is to provide a device of the afore-described character, consisting of first and second sections of a link chain, a hook secured on one end of the first section of said chain for engagement with a structural member, such as an automobile bumper beneath the container or trunk of said automobile, a coil tension spring with one end connected to an intermediate link of said first section, a resilient tube enclosing a part of the chain between the spring and the hook to prevent scratching the bumper or other structural member engaged thereby when in use, a second section of said chain with one end portion connected to the other end of the spring, a hook and eye member for engagement with a part of the trunk lid or other closure member, such as a shoulder portion provided on the inside of said lid, said second section being threaded through the eye portion of said hook and eye member and looped back on itself, a hook on the free end of said second section for adjustable connection with an intermediate link of the latter, the other end of said first section being connected to a link of said second section near its point of securing it to the other end of said spring and of such length beyond the point of connection of an intermediate link thereof with said spring that it loosely spans the spring when free, so as to permit only limited extension thereof when used for the purpose specified.

A further object of my invention is to provide in a device as recited in the preceding paragraph, a hook on said other end of the spring for direct engagement with said closure member, for use as an alternative to the hook on the free end of said second section.

These and other objects and advantages will become apparent from the following detailed description when taken with the accompanying drawings. It will be understood that the drawings are for the purposes of illustration and do not define the scope or limits of the invention, reference being had for the latter purpose to the appended claims.

In the drawings, wherein like reference characters denote like parts in the several views:

FIGURE 3 is a perspective view of the rear portion of the automobile body showing the trunk lid open to a less extent than that shown in FIGURE 1, with the device embodying the invention adjusted to hold the lid partially closed and in contact with the package.

FIGURE 4 is a view similar to FIGURE 2 showing the trunk lid holder adjusted as shown in FIGURE 3.

Figures 1, 2:
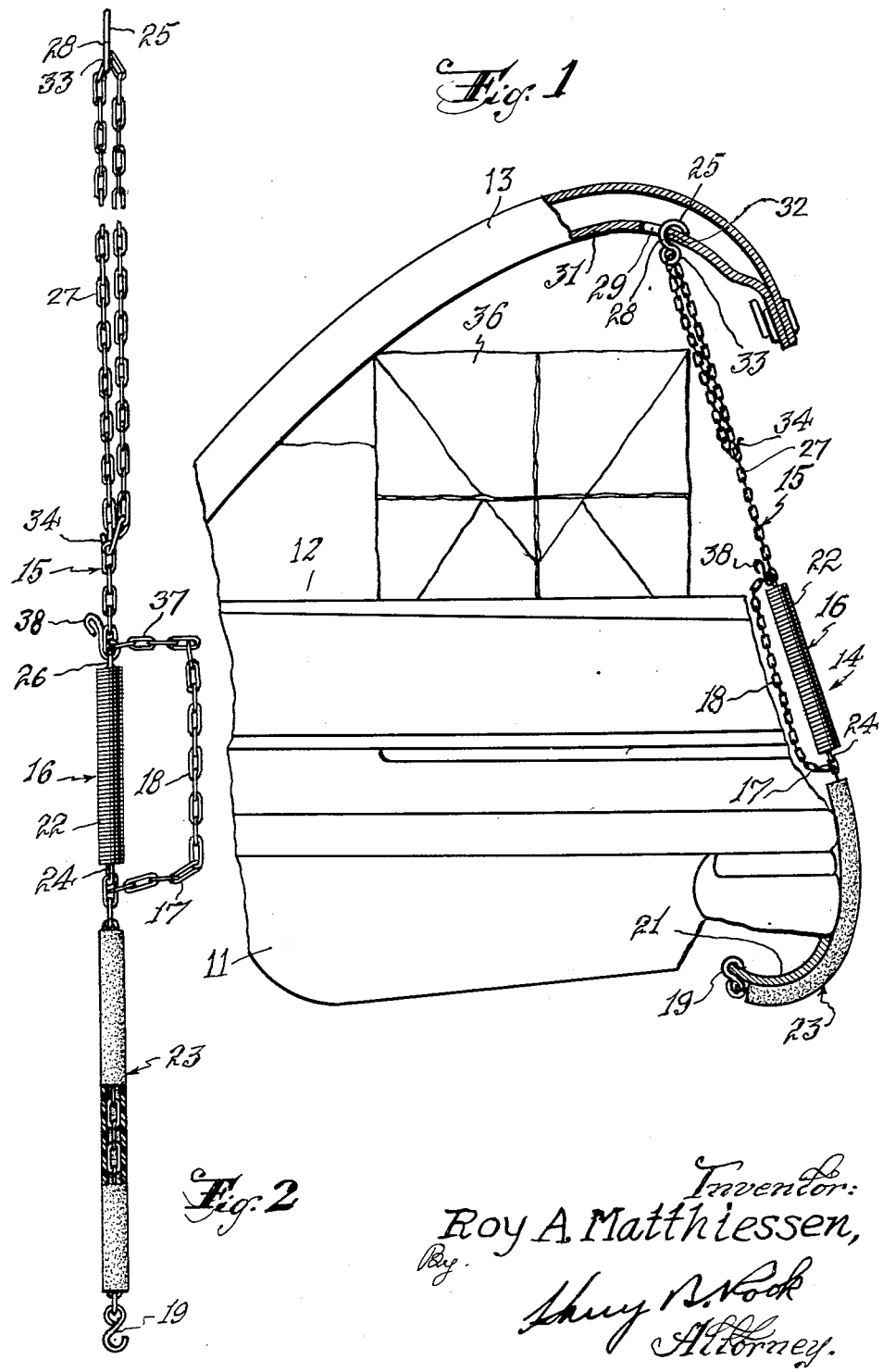
FIGURE 1 is a fragmentary side elevational view of the rear portion of an automobile, showing the trunk lid thereof, hinged thereto or movably associated therewith, in partially open position because of engagement with a large package held in the trunk, and a device embodying my invention resiliently holding the lid only partially closed and in contact with the package.
FIGURE 2 is an enlarged elevational view, with a part broken away and shown in section, showing the automobile trunk lid holder in the condition illustrated in FIGURE 1.

Referring to the drawings in detail, like parts being designated by like reference characters, there is shown a portion of an automobile or car 11 having a structure forming a trunk 12, and a lid 13 for said trunk. The trunk may be of conventional construction, with the lid hinged thereto or movably connected therewith in any desired manner and provided with the usual locking and holding mechanism.

The illustrated trunk lid holder 14 embodying my invention, generally designated 14, consists of chain means such as a link chain 15 and connected resilient means 16, together with means for connecting said holder respectively to the container, trunk or other structural member 21 of the automobile and the closure member or trunk lid 13.

Specifically, the present embodiment comprises a flexible connector such as a chain 15, which may be considered to include two sections, 17 and 27. The first section 17 of the chain 15 is desirably formed of a plurality of links 18. There is in this embodiment an S-hook 19 at and secured to one end, in this case the lower end, of the section 17 for engaging the lower edge portion of a structural member, in this case the car bumper 21, as shown most clearly in FIGURE 2. In order to avoid scratching the bumper, or other part of the car engaged by the chain 17, I desirably cover that portion of said chain between the hook 19 to its point of connection with the resilient means 16, desirably a closely wound tension coil spring 22, with a resilient flexible tube 23, desirably formed of durable material, examples being plastic and rubber. The coil spring 22 has an eye 24 at one end, in this case its lower end, connected to an intermediate portion or link 18 of the section 17 in any desired manner.

The other end of the spring 22 is likewise desirably provided with an eye 26, and a second section 27 of said link chain is provided with one end portion secured to said other end of the spring 22, as at said eye 26. Threaded on the second chain section 27 is a hook and eye member 28, the hook portion 25 of which is adapted to connect with the lid 13 in any desired manner, as by passing through an aperture 29 in the lid lining 31 and hooking over the shoulder formed by the edge portion 32 at the lower side of said aperture 29.

The chain section 27 is freely slidable through the eye portion 33 of the member 28 and its free end carries a hook 34 which is adjustably insertable in one of the links of said second section, as viewed in FIGURE 2, so as to cause the desired stretching of the spring 16 for resiliently holding the lid 13 in the desired partially shut position, as when engaging the relatively large package 36. Such a package may, if desired, be replaced by a chock or other device for holding the lid against complete closing.

In order to prevent stretching the spring 22 to an undesired extent or beyond its elastic limit, I form the portion 37 of the first chain section 17 beyond or above the lower end of the spring 22, of such a length that, when connected to the upper or other end of said spring 22 or the adjacent link of the second chain section 27, as illustrated particularly in FIGURE 3, the spring 22 may not be destructably extended without breaking the portion 37 of said chain. In this way the spring 22 is kept in serviceable condition while being allowed to perform the function for which it is intended.

In order that the same device may be utilized for holding partially open trunk lids in wide open position or in only slightly open position, a hook 38 is connected to the eye 26 at the upper end of the spring 22, and this hook 38 may be connected to any of the links of the chain section 27, and the chain section may be pulled through the eye portion 33 of the hook and eye member 28 so as to permit the overall length of the device to be adjusted for holding trunk lid covers that are open only to a small extent as shown in FIGURES 3 and 4, or, if desired, the hook 38 could be hooked directly into the eye 33 of the hook and eye member 28 or into the opening 29 in the lid lining 31. The holder 14 thus has a large range of adjustability, that is, from the maximum length with the hook 34 connected to a link close to the hook and eye member 28, to a minimum length with the hook 38 engaging the eye 33 of the hook and eye member 28, and with the possibility of a large number of adjustments intermediate these two limits.

From the foregoing disclosure it will be seen that I have devised a holder 14 for closure members, particularly the lids of automobile trunks, consisting of two chain sections 17 and 27, one of which sections has an end provided with an S-hook 19 to be connected to the lower edge of the car bumper 21 and also has one end of a helical spring 22 connected thereto in spaced relationship to the other end of the chain section. The other end of said chain section 17 is connected to the other end of the spring 22, with slack in the section permitting it to be extended, while limiting its extension to a predetermined safe amount. The other end of the spring 22 has a hook 38 and second chain section 27 connected thereto, said second section looping through the eye portion 33 of a hook and eye member 28 which in turn, connects with the trunk lid 13, and carries a hook 34 at its other end for adjustable connection with intermediate links of the section. The hook 38 and the hook 25 of the hook and eye device are adapted alternatively to connect with the inner side of the trunk lid 13. A cover 23 is applied over the first chain section below the spring 22 to protect against damage the bumper 21 or other part of the car engaged thereby.

I claim:

1. A device for holding a closure member partially shut with respect to an associated container and in resilient engagement with an object enclosed thereby comprising a link chain consisting of first and second sections, a coil tension spring with one end connected to an intermediate portion of the first section of said chain, the second section of said chain having one end portion secured to the other end of said spring, one end of said first section being connected to said second section near its point of securing it to the other end of said spring and of such length beyond the point of connection of the intermediate portion thereof with said spring, that it loosely spans the spring when free to permit only limited extension thereof, a hook on the end of the first section of said link chain, a hook and eye member for engagement with said closure member, the second section of said chain being threaded through the eye portion of said hook and eye member and looped back upon itself, and a hook on the free end of said second section for an adjustable connection with an intermediate link of the latter.

2. A device as defined in claim 1 with the addition of a hook connected to the second-mentioned end of the spring for direct engagement with said closure member, for use as an alternative to the hook and eye member.

References Cited in the file of this patent

UNITED STATES PATENTS

| | | |
|---|---|---|
| 186,319 | Dietz | Jan. 16, 1877 |
| 315,959 | Pattyson | Apr. 14, 1885 |
| 556,618 | Chaffin | Mar. 17, 1896 |
| 581,552 | Greer | Apr. 27, 1897 |
| 710,670 | Cutler et al. | Oct. 7, 1902 |
| 1,002,013 | Urban | Aug. 29, 1911 |
| 1,122,199 | Gadbois | Dec. 22, 1914 |
| 1,478,955 | Harrison et al. | Dec. 25, 1923 |
| 1,509,012 | Whiting | Sept. 16, 1924 |
| 2,020,943 | Hallquist | Nov. 12, 1935 |
| 2,159,223 | Okun | May 23, 1939 |
| 2,442,266 | Davis | May 25, 1948 |
| 2,545,320 | Tilson et al. | Mar. 13, 1951 |
| 2,550,203 | Robinson | Apr. 24, 1951 |
| 2,908,522 | Glave | Oct. 31, 1959 |